United States Patent [19]

Froom

[11] E Patent Number: Re. 33,204

[45] Reissued Date of Patent: Apr. 24, 1990

[54] CARTON FOR PACKAGING ICE CREAM OR LIKE FROZEN INITIALLY LIQUID OR SEMI-SOLID MATERIAL

[75] Inventor: Thomas W. Froom, Pittsford, N.Y.

[73] Assignee: Rolph-Clark-Stone Packaging Corporation, Newport News, Va.

[21] Appl. No.: 126,257

[22] Filed: Nov. 25, 1987

Related U.S. Patent Documents

Reissue of:

[64] Patent No.: 4,555,027
Issued: Nov. 26, 1985
Appl. No.: 533,454
Filed: Sep. 19, 1983

[51] Int. Cl.[5] ..... B65D 5/54

[52] U.S. Cl. ..... 206/626; 229/151; 229/160; 229/905

[58] Field of Search ..... 206/611, 624, 626; 229/160, 151, 905

[56] References Cited

U.S. PATENT DOCUMENTS

| | | | |
|---|---|---|---|
| 610,255 | 9/1898 | Bisler . | |
| 998,109 | 7/1911 | Morlan . | |
| 1,080,190 | 12/1913 | Bauer . | |
| 1,372,218 | 3/1921 | Davidson | 229/160 |
| 1,963,626 | 6/1934 | Lewandowski | 229/151 |
| 2,007,520 | 7/1935 | Daller | 229/51 |
| 2,160,164 | 5/1939 | Palmer | 229/45 |
| 2,342,198 | 2/1944 | Hultin | 93/3 |
| 2,367,008 | 1/1945 | Davidson | 229/33 |
| 2,496,043 | 1/1950 | Farrell | 229/5.5 |
| 2,661,143 | 12/1953 | Inman | 229/905 |
| 2,670,128 | 2/1954 | Stowitts | 229/33 |
| 2,713,454 | 7/1955 | Nute et al. | 229/51 |
| 3,000,548 | 9/1961 | Frazier | 229/51 |
| 3,097,783 | 7/1963 | Burt et al. | 229/37 |
| 3,107,041 | 10/1963 | Wagner, Jr. | 229/39 |
| 3,194,479 | 7/1965 | Rumberger | 229/43 |
| 3,197,114 | 7/1965 | Holmes | 206/624 |
| 3,206,103 | 9/1965 | Bixler | 206/624 |
| 3,281,055 | 10/1966 | Buttery et al. | 206/624 |
| 3,281,058 | 10/1966 | Buttery | 206/624 |
| 3,309,834 | 3/1967 | Buttery | 53/21 |
| 3,543,997 | 12/1970 | Michetti et al. | 229/51 |
| 3,572,576 | 3/1971 | Foster | 229/31 |
| 3,833,165 | 9/1974 | Hoiles | 206/624 |
| 3,854,651 | 12/1974 | Osborne | 229/34 R |
| 4,046,313 | 9/1977 | Perry | 206/624 |
| 4,084,489 | 4/1978 | Matovich, Jr. | 93/36.8 |
| 4,239,115 | 12/1980 | Froom | 206/611 |
| 4,569,184 | 2/1986 | Strombeck | 53/564 |

FOREIGN PATENT DOCUMENTS

| | | |
|---|---|---|
| 651573 | 1/1963 | Italy . |
| 1018420 | 1/1966 | United Kingdom . |

*Primary Examiner*—Stephen P. Garbe
*Attorney, Agent, or Firm*—Shlesinger & Myers

[57] ABSTRACT

There is disclosed a rectangular or box-shaped carton suitable for packaging semi-solid material, such as ice cream, having front and end lips which are inturned, respectively, from the top edges of the front and end walls of said main body and which underlie the cover and extend all the way across said front edge and at least most of the way back along said end edges, and various refinements thereof.

20 Claims, 10 Drawing Sheets

CARTON FOR PACKAGING ICE CREAM OR LIKE FROZEN INITIALLY LIQUID OR SEMI-SOLID MATERIAL

Matter enclosed in heavy brackets [ ] appears in the original patent but forms no part of this reissue specification; matter printed in italics indicates the additions made by reissue.

FIELD OF INVENTION AND PRIOR ART

The invention relates to a box-shaped carton for packaging ice cream or like frozen, initially liquid or semi-solid material and intermediates formed in the manufacture thereof.

In my co-pending application Ser. No. 158,167 filed June 10, 1980 and my U.S. Pat. No. 4,239,115 issued on the parent thereof on Dec. 16, 1980, there is disclosed an improved carton for packaging ice cream and like frozen, initially liquid or semi-solid material, which had substantial leakproof characteristics. It is an object of this invention to provide an improved carton of this type which has all the advantages described in said application and U.S. Patent plus the further advantage that it is still more leakproof.

SUMMARY OF THE INVENTION

This invention relates to a box-shaped carton or rectangular carton for packaging ice cream or like frozen, initially liquid or semi-solid material, which comprises a box-shaped main body, a cover for said main body which is hinged to the rear edge thereof, lie flat on the top edges thereof, and has flaps depending from its front and end edges which are fastened together to form a skirt overlying the front and end walls of said box-shaped body in flat, face-to-face contact, and front and end lips which are inturned, respectively, from the top edges of the front and end walls of said main body and which underlie said cover and extend all the way across said front edge and at least most of the way back along said end edges, and is particularly directed to a carton blank composed of a single sheet of carton stock having cut portions and fold lines so that said sheet can be folded into an open-ended rectangular or box-shaped carton for receiving the packaging material having a closed end and an opened end which on closure forms a completely closed rectangular box-shaped carton package.

The invention further comprises one or more additional features in which each of the end walls of said main body is formed from intact, overlapping, front, rear, and bottom end-wall-forming flaps which project respectively from the end edges of the front, rear, and bottom walls of said main body, said front and rear end-wall-forming flaps forming rectangular inner end walls that completely fill and determine the shape of the ends of said main body, said front end-wall-forming flaps having said end lips inturned from the top edges thereof, and said front wall having said front lip inturned from the top edge thereof, in which said front lip is articulated to said front wall on a skip-cut or half-cut fold line aligned in the grain of the carton stock and in which the parts of said fold line between the cut portions thereof are press scored, and in which each said end lip is articulated to the top edge of said front end-wall-forming flap on a semi-cut-scored fold line aligned in the grain of the carton stock.

The invention also contemplates one or more additional features, and which adjacent ends of said front and end lips have complementary shapes so that they abut each other in the erected carton and form a sealed corner or in which said front lip is square cut on lines displaced inwardly of the fold lines of the front end-wall-forming flap a distance substantially equal to the thickness of the carton stock and the end lips are square cut outwardly of the fold lines of the front end-wall-forming flaps a distance substantially equal to the effective width of said front lip, preferably with the fold line of said front lip being displaced below the plane of the top edges of said main body so that said front lip has a small rise from its fold line to its edge, the effective width thereof being its projection on said plane. In the latter construction, the ends of said front lip substantially abut the front end-wall-forming flaps and the inner edge thereof is substantially coincident with the inner edges of said end lips.

In a preferred form of the invention the end corner flaps are provided with a tear-out tab which is formed as a lateral of the tuck-in tab and in the erected carton, is adhered to the portion of the bottom end-wall-forming flap which overlies it. Advantageously, this tear-out tab is connected to said end cover flap by a tear line which, in the erected container, is coincident with the top edge of the bottom end-wall-forming flap. It is also of advantage to have the tear-line formed a a skip-cut or half-cut line having a cut at the end thereof at the end of the cover flap and an intact portion at the other end thereof, such intact portion forming a bridge between the tear-out tab and the tuck-in tab.

Advantageously, there may also be included one or more features in which each of said rear end-wall-forming flaps has its top edge cut down a distance at least equal to the thickness of said carton stock and a length sufficient to accommodate the end lip which overlies it when it underlies the complementary, front end-wall-forming flap, in which each of said rear end-wall-forming flaps has an inturned lip which forms an extension of the inturned lip on the complementary, front end-wall-forming flap and in which the inturned lips on the complementary front and rear end-wall-forming flaps have complementarily cut ends which abut in the closed ends, and in which the top edge of each of the front end-wall-forming flaps and the inturned lip thereon extends substantially all the way across the closed ends of said main body and, preferably, in which each front end-wall-forming flap has its free end cut away somewhat below the top edge thereof to expose the underlying rear end-wall-forming flap sufficiently for the application of glue thereto, whereby the bottom end-wall-forming flap can be glued to the rear end-wall-forming flap adjacent its fold line and to the front end-wall-forming flap adjacent its fold line. Broadly speaking, it is advantageously to provide that at least a portion of each of the rear end-wall-forming flaps be exposed, no matter which end-wall-forming flap overlaps the other, to provide a glue area for affixing the complementary bottom end-wall-forming flaps thereto.

BRIEF DESCRIPTION OF THE DRAWINGS

In the drawings:

FIG. 6 is a partial view of FIG. 8 showing the front and rear end wall-forming flaps folded in;

FIG. 11 is a partial view showing the front end wall-forming flap folded in;

FIG. 23 is a partial section corresponding to FIG. 20 with lip 22 folded in.

DESCRIPTION OF THE PREFERRED EMBODIMENTS

Figure 1:
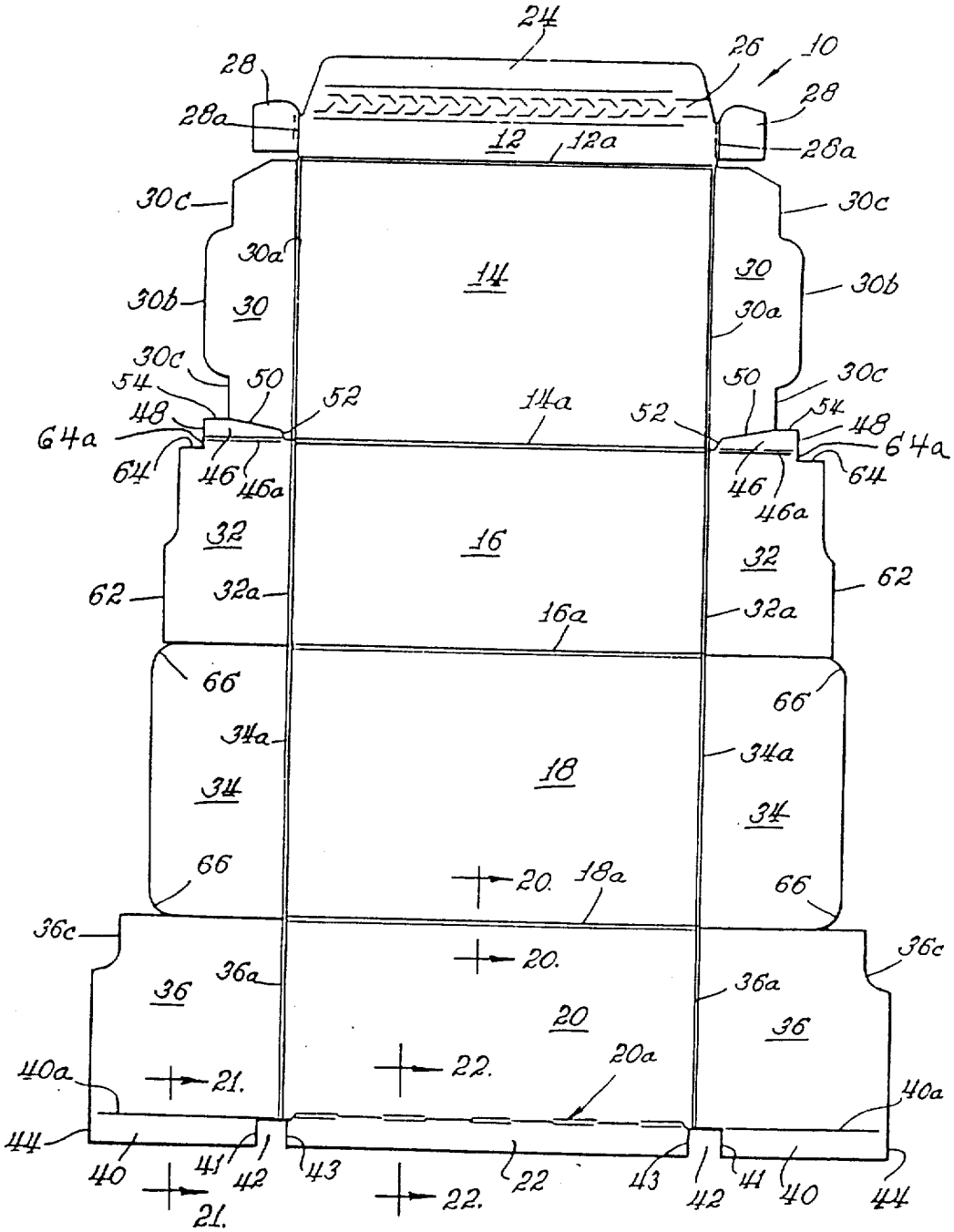
FIG. 1 is a plan view of a carbon blank.

Referring now particularly to FIG. 1, there is shown a carton blank 10 having flap 12, panels 14, 16, 18, and 20 and lip 22, articulated in that order by parallel fold lines 12a, 14a, 16a, 18a, and 20a. The panel 14, which is the cover-forming panel has articulated thereto front cover flap 12 which has glue panel 24 attached thereto by tear strip 26.

Extending laterally from the panels 12, 14, 16, 18, and 20, are glue tabs 28, end-forming flaps 30, 32, 34, and 36 which are articulated with the panels by means of the vertical fold lines 30a, 33a, 34a, and 36a normal to the parallel fold line.

The flaps 30 are end-cover flaps. Flaps 32, which extend laterally from the rear panel 16, are rear end-wall-forming flaps. Flaps 34, which extend laterally from the bottom panel 18, are bottom end-wall-forming flaps. And flaps 36, which extend laterally from the front panel 4, are front end-wall-forming flaps.

Projecting laterally from the front cover flap 12 are glue-tabs 28, which are articulated therewith by vertical fold lines 12a. The vertical fold lines 30a, 32a, 34a, and 36a are aligned in an essentially common vertical fold line. The fold lines 28a, however, are displaced laterally with respect to the other vertical fold lines, so that the distance between the fold lines 28c is greater than the distance between the fold lines 30a such that, in the erected carton, the glue-tabs 28 overlie the end-cover flaps 30.

Figure 2:
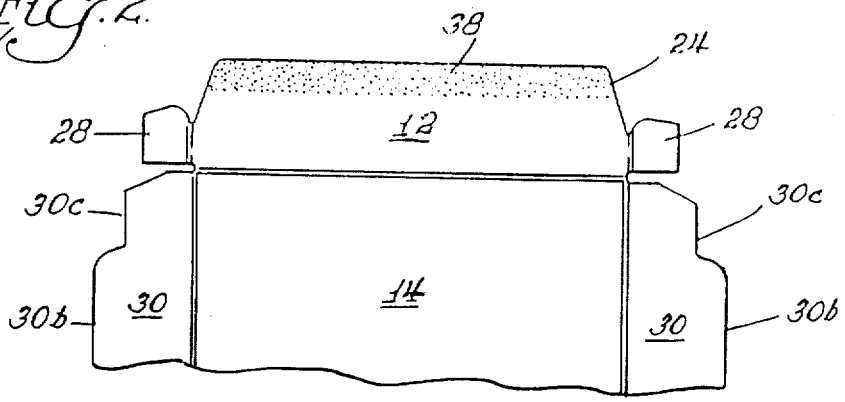
FIG. 2 is a detail view of a modified form of FIG. 1.

In FIG. 2, the tear strip 26 is omitted and a frangible glue 38 is applied to the glue panel 24 so that the front cover flaps 12 can be readily broken away from the front panels 20.

Figure 3:
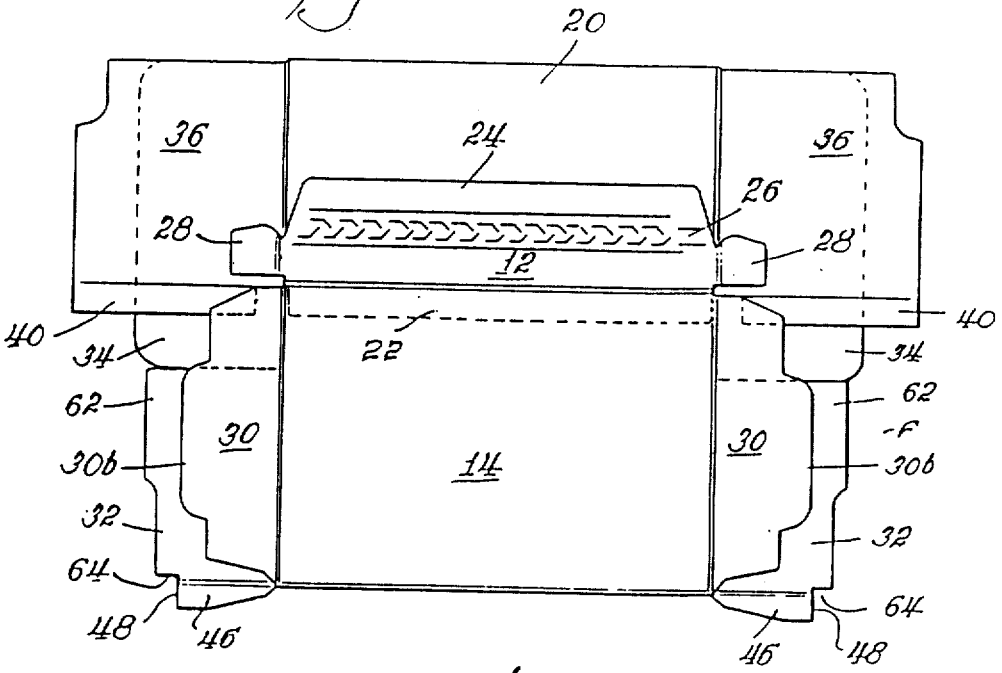
FIG. 3 is a collapsed carton tube formed of FIG. 1.
Figure 4:
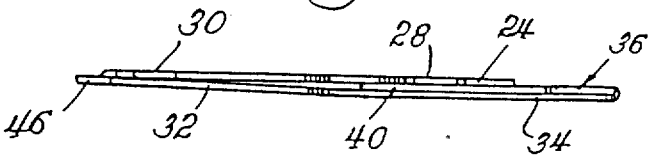
FIG. 4 is an end view of FIG. 3.
Figure 5:
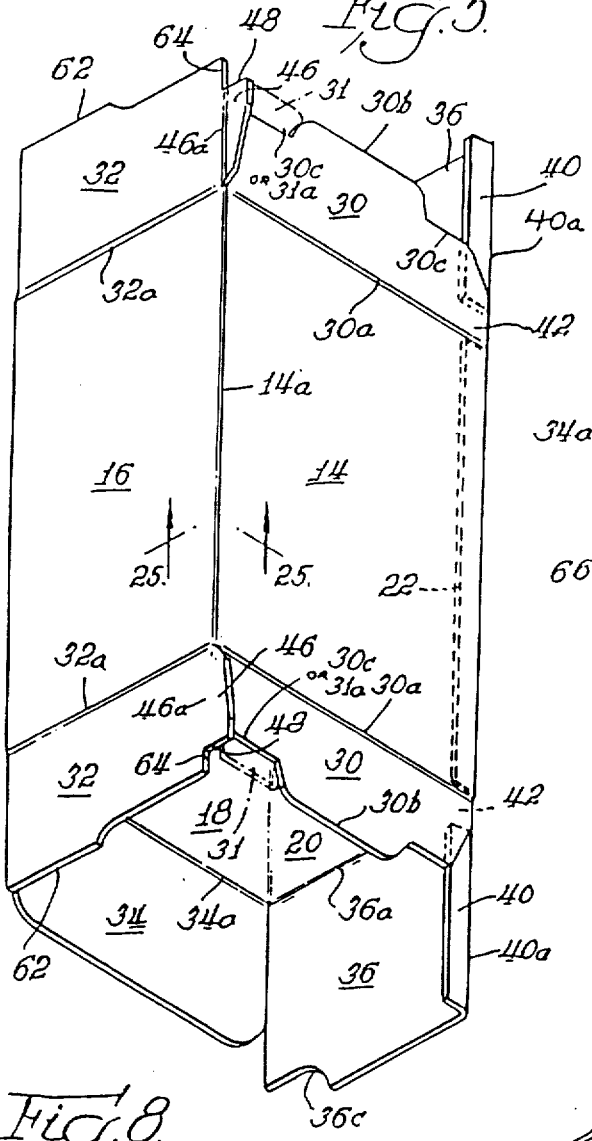
FIG. 5 is an isometric view of the opened-up tube of FIG. 3.

In FIGS. 3 and 4, the glue panel 24 is glued to the front panel 20, to form a collapsed tube, which can be opened up into the tube shown in FIG. 5.

The end-cover flaps 30 are provided with tuck-in tabs 30b having rounded ends 66a and 66b. These tabs extend over the greater portion of the end-cover flaps 30, but are inset from the ends thereof as shown at 30a for a purpose which will become apparent in the description of the assembly of the carton.

Also, for purposes which will become apparent in the description of the assembly of the carton, the front end-wall-forming flaps 36 have lips 40 articulated thereto by fold lines 40a aligned or substantially aligned with the fold line 20a. These fold lines are so located that when the lips are folded in, the top faces are substantially in the plane of the top edges of the front and end walls so that in the erected carton the lips 40 and optionally the lip 22, underlie the cover panel in substantially flap surface-to-surface contact. Also, they are aligned in the grain of the carton stock, as are score lines 12a, 14a, 16a, and 18a. For this purpose, it is sometimes advantageous to have fold lines 40a displaced a small increment below the top of the carton in order to insure that the cover panel will be flat against the lips 40.

The fold lines are formed in a manner already well known in the art. However, it is an advantage if the fold lines separating the panels from each other and from the flaps be press-scored or creased fold lines, if the fold lines 40b be half- or semi-cut-scored fold lines, and if the fold lines 20a be a skip-cut press-scored or creased fold line. It is of a special advantage to have the cut-scored fold lines, particularly the semi- or half-cut-scored fold lines 40b aligned in the grain of the carton stock since the cuts are then not cross-grain cuts.

Figures 17, 27:
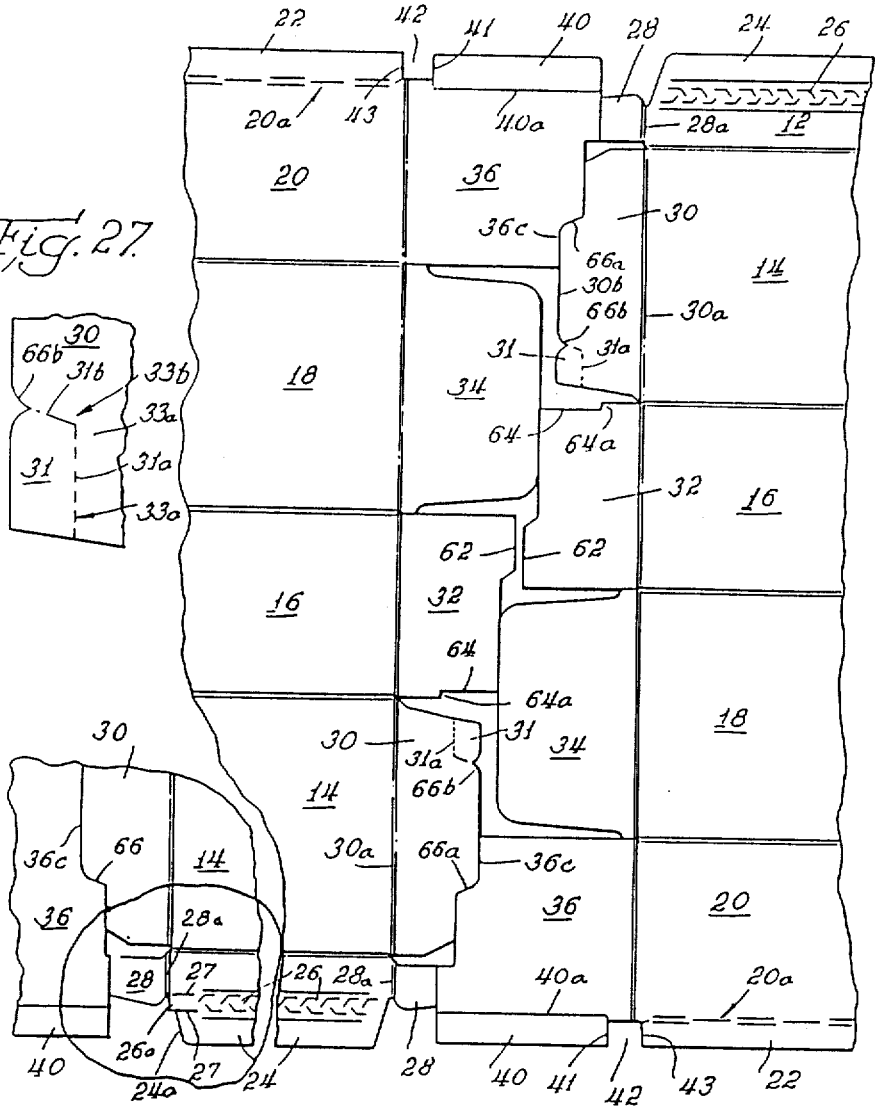
FIG. 17 is a plan view illustrating how the carton blanks of FIG. 1 are cut and scored from stock sheet material.
FIG. 27 is a partial view showing a detail of FIG. 17.
Figure 18:
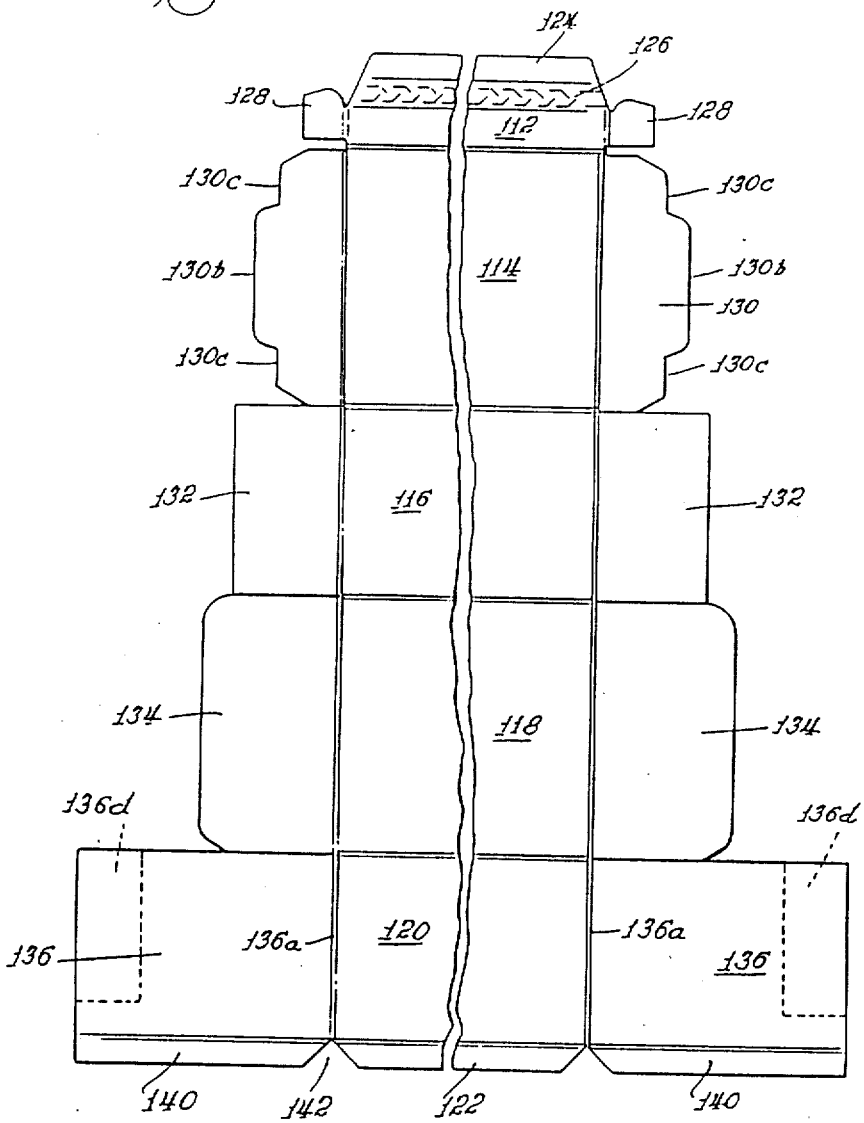
FIG. 18 is a plan view of a modified carton blank.
Figure 19:
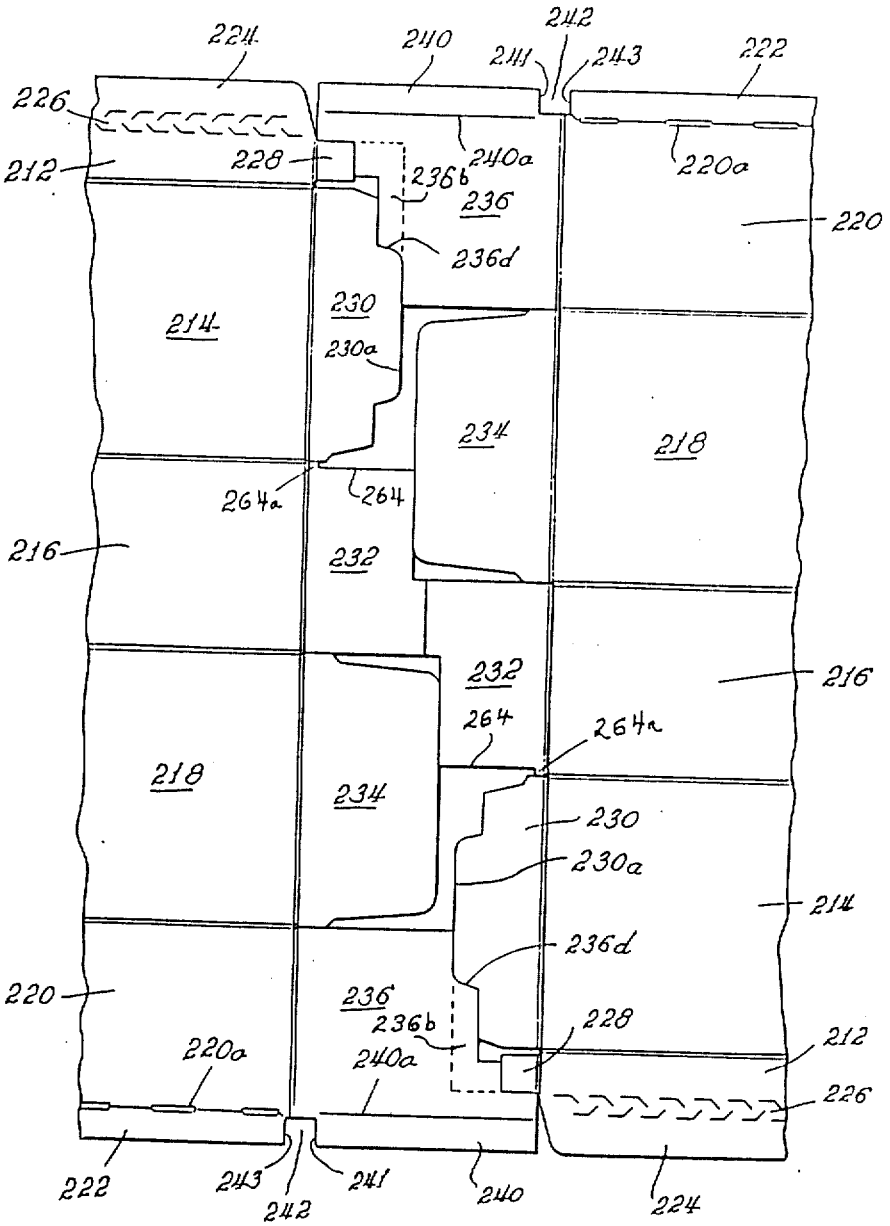
FIG. 19 is a plan view of another modified carton blank showing how this blank is cut and scored from stock sheet material.
Figure 26:
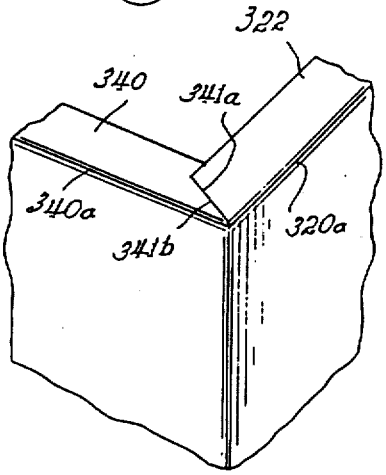
FIG. 26 is a partial view of a modified form.

The inner ends of the lips 40 and outer ends of lip 22 are cut on complementary angles, which may be 90 degrees, as shown at 42 in FIG. 1, or 45 degrees, as shown in FIGS. 18 and 26. In any case, they are cut so that in the erected carton, an edge of one lip abuts or is very close to an edge of the adjacent lip. To this end, the lip 22, advantageously, is square-cut in, as shown at 43, a distance in from fold line 36a substantially equal to the thickness of the carton stock so that the square-cut ends will substantially abut the flaps 36 in the erected carton. Similarly, the lips 40 are square-cut back, as shown at 41, a distance substantially equal to the width of the lip 22 so that in the erected carton the square-cut ends 41 substantially abut the edge of lip 22. Also, they may be cut on 30 and 60 degree angles or like complementary angles, if desired, provided, the lip cut with the samll angle is also square-cut along a line which is coincident with the edge of the other lip and intersects the angle-cut as shown at 341a and b of FIG. 26. The outer ends of lips 40 can be beveled, or they can be left square, i.e., in alignment with the outer edges of flaps 36, as shown in FIG. 1. Optionally, lips 46 can be provided on flaps 32 and articulated therefrom by fold lines 46a, also advantageously half- or semi-cut-scored fold lines, in alignment with, or slightly below, fold line 14a. The outer ends of the lips 46 are cut on angles, for example, square-cut, as shown at 48, and are complementary to the ends 44 of lips 40. The flips are separated from the flaps 30 by cut lines 50 which angle down from the top edge 54 to point 52 and then in an "s" curve to the juncture of the fold lines 14a and 46a. It will be understood, however, that the lips 46 are optional and can be omitted, if desired, as shown in FIGS. 17 and 19. In such case, however, the shoulder 64a is retained.

Also the modification shown in FIG. 17 can be further modified so that the side cover flap 30 is provided with a tear-out tab 31 located so that in the closed end, it overlaps the rear end-wall-forming flap 32 and underlies the bottom end-wall-forming flap 34 with the tear line 31 in position in the closed end to coincide with the top edge of the bottom end-wall-forming flap 34. Details of the construction of this tear-tab 31 are shown in FIG. 27.

It will be observed that in FIG. 3, the lip 22 underlies the cover panel 14 and the lips 40 underlie the ends of the end cover flaps 30. Consequently, when the flattened tube is opened up to the position shown in FIG. 5, lip 22 will be bent inwardly to underlie the cover panel 14 and the lips 40 will be bent in to underlie the end cover flap 30, as shown in FIG. 5. The skip-cut press-scored fold line 20a and the half- or semi-cut-scored fold lines 40a give the proper combination of freeness and resistance in these infolding actions. It will be understood, however, that in the broad aspects of the invention, other types of fold lines can be substituted for the skip-cut press-scored fold line 20a and the semi- or half-cut-scored fold lines 40a.

Figure 7:
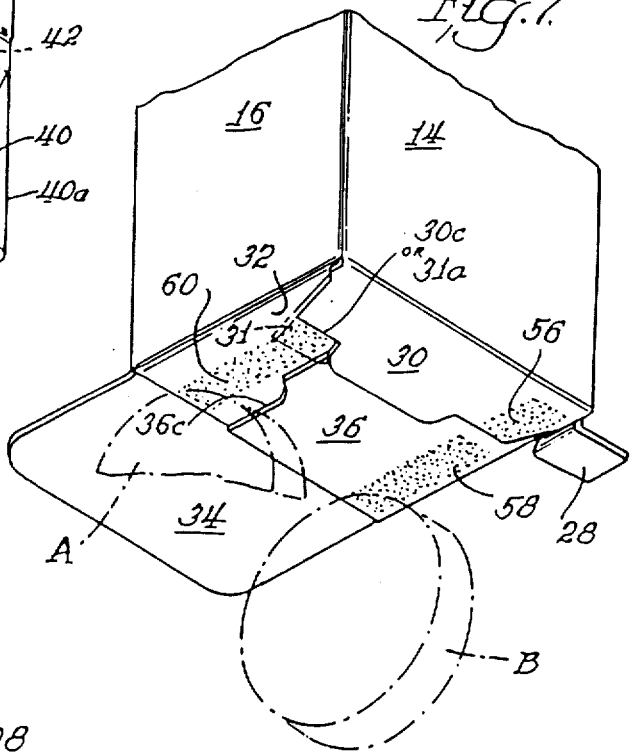
FIG. 7 is a like view showing the end cover flap folded in, remaining flaps folded out, hot-melt glue strips applied, and stylized applicators therefor.
Figure 14:
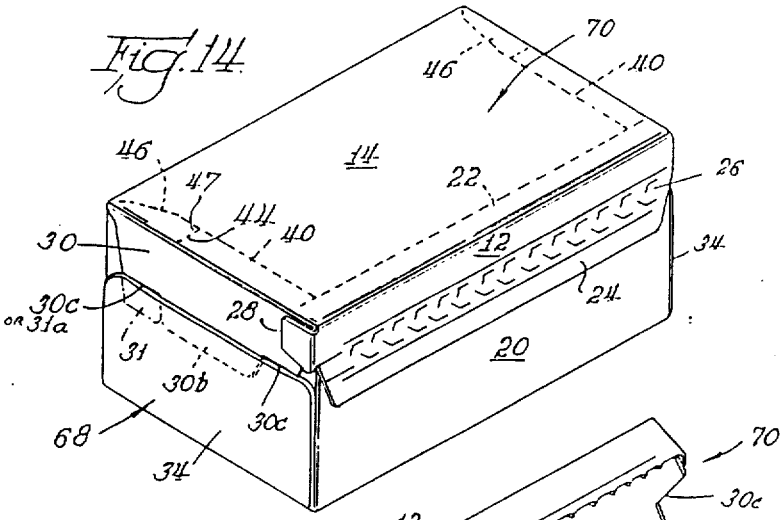
FIG. 14 is another isometric view of the finished package of FIG. 13.

In assembling the carton, the rear end-wall-forming flap 32, with the lip 46, if used, folded in at right angles, is folded in first so that lip 46 underlies the cover panel 14, and then the front end-wall-forming flap 36, with lip 40 bent in at right angles, is folded in so that it overlies flap 32 and lip 40 underlies cover panel 14. Flap 32, advantageously, is cut down at 64 a distance equal, or substantially equal, to the thickness of the carton stock to accommodate lip 40 which then abuts the shoulder 64a of the uncut portion of flap 32, or lip 46 if it is present and, as may be best visualized in connection with FIG. 16, keeps the panels 32 and 36 from telescoping and thus prevents any inward movement of the top of the front panel 20. As best seen in FIG. 14, the edge 47 of lips 46 and the edge 44 of lip 40 are cut on complementary angles so that they are capable of substantial abutment in the finished carton. Then, as shown in FIG. 7, the end-cover flap 30 is folded down with the bottom end-wall-forming flap 34 and the glue-tab 28 folded back out of the way, and hot-melt glue applicators. A and B apply hot-melt glue strips 56, 58, and 60. The hot-melt applicator B first contacts the end-cover flap 30 and deposits the glue strip 56 and then continues on to deposit the glue strip 58. Concurrently, as the glue strip 58 is applied, the glue strip 60 is applied by glue applicator A. The applicators A and B are programmed so that the glue strip 56 is applied first and then the glue strips 58 and 60 applied simultaneously. If desired, the glue strip 56 can be applied independently of the application of glue strip 58. Also, if desired, the glue strips can be applied in the reverse order, that is, from the bottom panel upward. Either the glue applicators A and B can be mounted to move over the carton tube of FIG. 7, or the glue applicators A and B can be stationary and the partially assembled tube of FIG. 7 passed under or over or, in any event, passed into contact with the glue applicators A and B.

If the tear-out tab 31 is used, hot-melt glue is applied so that it covers the tear-out tab 31 up. If desired, the tear-out tab 31 can first be glued down to the rear end-wall-forming flap 32 and the glue strip 60 run over the glued down tear-out tab 31 from, or to, the tear-line 31a, depending on whether the application of the hot-melt begins, or ends, at the tear-line 31a.

It is to be understood that the term "hot-melt glue" is to include any adhesive commonly applied by the hot application method.

Advantageously, the partially assembled tube cartons can be moved along a continuous belt (not shown), with the open end resting on the belt and the end to be sealed, uppermost. In such case, it is desirable that the movement be in the direction of the folded-back flap 34, so that any tendency for the flaps 32 and 36 to be displaced, will be corrected by the flap 30, which is folded down over the folded-in-flaps 32 and 36.

Figure 6:
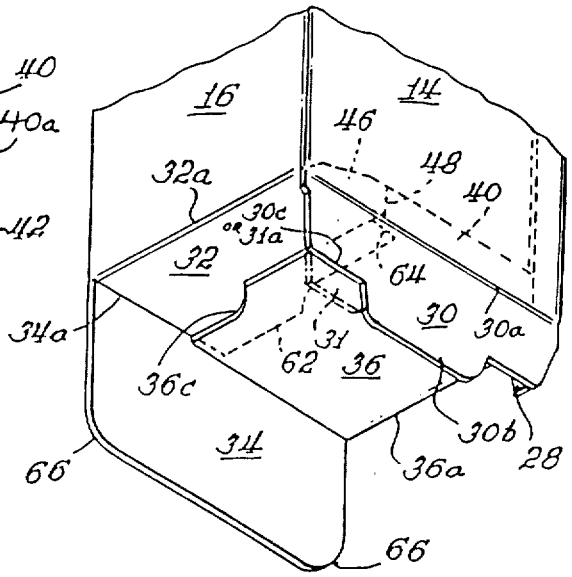

The dimensions of flaps 32 and 36 are such that when they are folded in the position shown in FIGS. 6 and 7, they form a rectangular end wall commensurate in area and shape with the area and shape of the end wall of the carton tube. Thus, when they are in the position shown in FIGS. 6 and 7, or especially when the end cover flap 30 is folded down, as in FIG. 7, they hold the tube in its intended rectangular shape, especially when, as described above, the flap 32 is cut down at 64 and lip 40 abuts shoulder 64a of the uncut portion of flap 32. This, coupled with the fact that the glue strips are applied adjacent the score lines between these flaps and the front and rear panels, keep the carton tube rigid and provide support for the flaps so that the sealing of the ends can be effected without a mandrel before the carton is filled.

Figure 8:
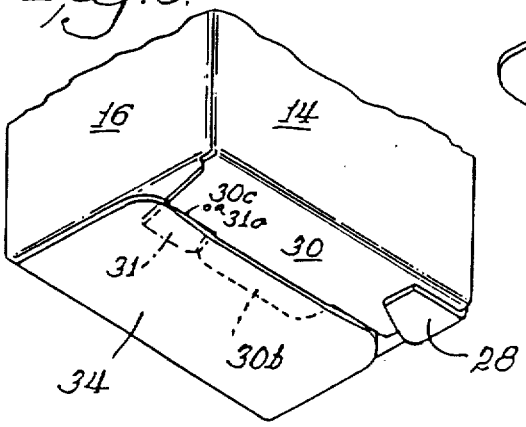
FIG. 8 is a like view in which the remaining flaps are folded into place to form the closed end of the carton tube.

The next step is to fold in the bottom end-wall-forming flap 34 and the glue-flap 28 into contact with the glue strips, as shown in FIG. 8.

It will be observed that the bottom end-wall-forming flap 34 and the end-cover flap 30 are proportioned so that the flap 34 covers the tuck-in tab 30b and the tear-out tab 31 and essentially abuts the inert portions 30c and the tear-line 31 if the center tab 31 is used, thereby forming the outer wall of the end of the carton.

It will be observed also, in FIGS. 6, 7, and 8, that when the lips 22 and 40 are in place under the cover panel 14, the lips abut to form a substantially continuous inturned lip which extends all the way across the end walls when the lip 46 is include and the complementarily cut edges 44 and 48 abut.

Figure 9:
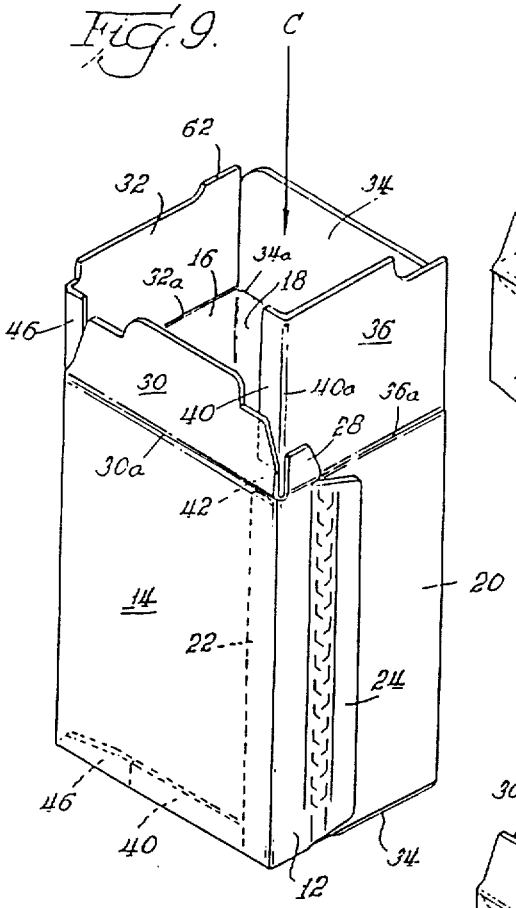
FIG. 9 is an isometric view of the carbon tube in position to be filled.
Figure 10:
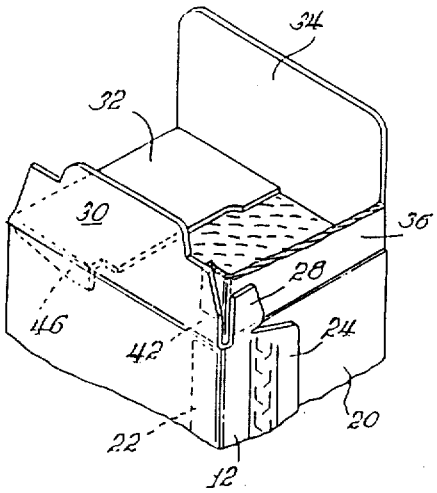
FIG. 10 is a partial view of the filled carton tube with the rear and wall-forming flaps folded in over the contents.
Figure 11:
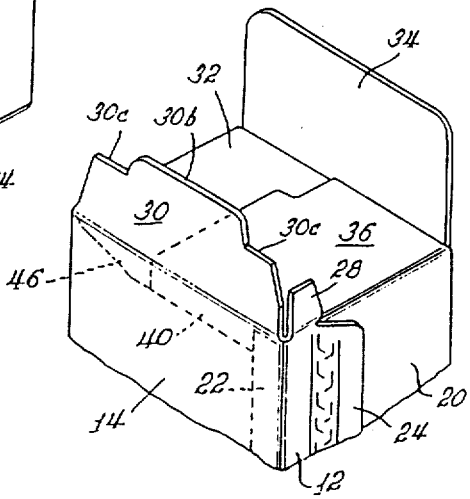
Figure 12:
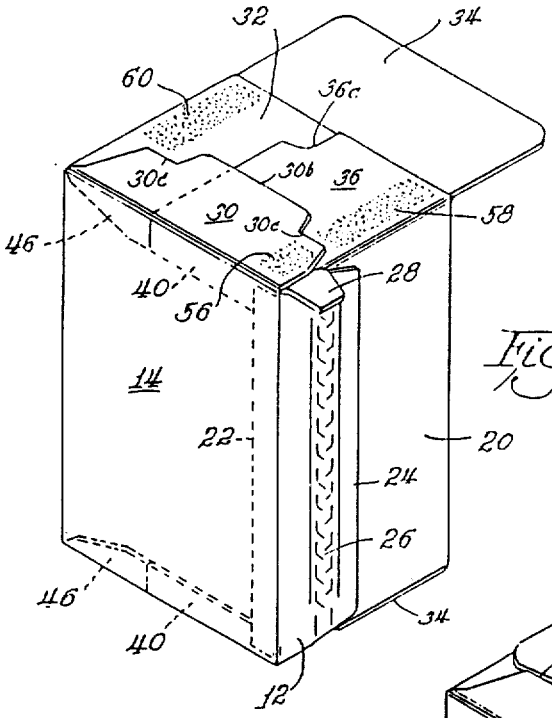
FIG. 12 is an isometric view showing additionally the end cover flap folded in and the bottom end-wall-forming flap and the glue tab folded out, together with glue strips of hot-melt glue applied, as in FIG. 7.
Figure 13:
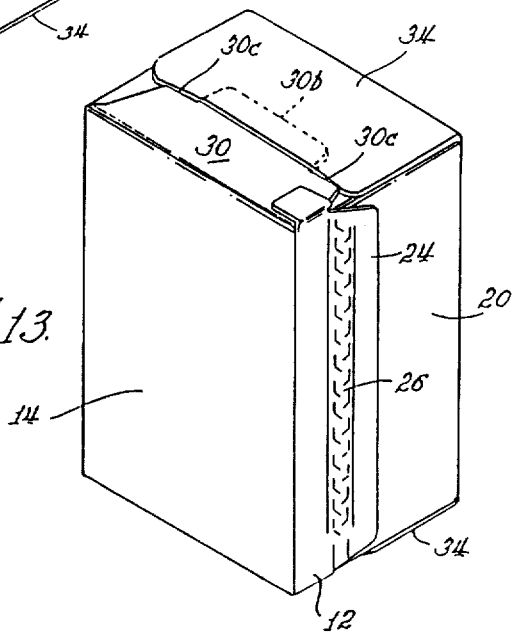
FIG. 13 is an isometric view looking toward the cover and front panel showing the finished package in which the folded-out flaps of FIG. 12 have been folded over into contact with the glue strips.

The partially assembled carton, with one end sealed and the other end open, is passed under a filling station, as shown in FIG. 9, where a semi-solid material C at ambient temperature which, suitably, is ice cream, sherbet, or the like, is introduced into the open-end tube until it is filled to the level of the score lines. The rear end-wall-forming flap 32, with the lip 34 turned in at right angles, is then folded in, as shown in FIG. 10, followed by the folding in of the front end-wall-forming flap 36, with lip 40 turned in at riht angles, as shown in FIG. 11, with lips 40 inserted between the material C and the cover panel 14. The sealing process is then carried out, as shown in FIG. 12, in the same way that the other end was sealed, as shown in FIG. 7, to form a finished package, as shown in FIGS. 13 and 14. The raised ends 62 projecting from the rear end-wall-forming flaps 32 are provided to cover the cut-out portions 36c of the end cover flaps 36 and can be omitted, if the flaps 32 are wide enough.

The cutouts 30c, as best seen in FIG. 12, are inset just enough to accommodate the glue strips 58 and 60.

The glue strips 58 and 60 extend down to the bottom of the front and rear end-wall-forming flaps 32 and 36 and, if desired partly onto the outer end-wall-forming flap 34 so that, when the flap 34 is folded up, a leakproof seal between the flaps 32, 34, and 36 is obtained.

The flap 34 and the portions of flap 30 left after the cutouts 30c are proportioned so that the outer ends of flaps 34 abut at 30c, as shown in FIG. 13.

By virtue of the fact that the glue-tabs 28 are on the outside of the end-cover flaps 30, the end-cover flaps 30 lie flat against the front end-wall-forming flaps and enhance both the strength of the cover and the leakproof character of the package. If the glue-flaps are folded under the end-cover flaps and glued to the underside thereof, they would place a short layer of carton stock between the end-cover flaps and the end wall. Thus would separate the end cover flaps from the end walls and promote leakage. In the invention, on the other hand, the glue-flaps overlap the end cover flaps and are glued to the outside thereof, so that the end cover flaps lie flat against the end walls. Thus, in cooperation with the inturned lips 40, minimizes leakage because of the extended flat surface-to-surface contact between the cover and the end cover flaps and the end walls including lips 40. Thus, there is less tendency for leakage to occur.

Figure 16:
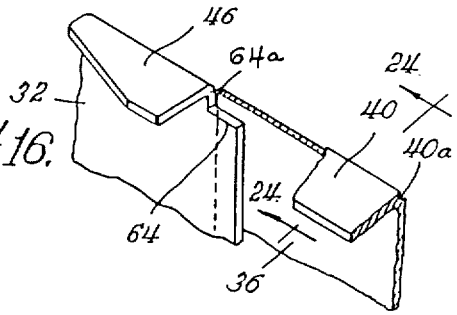
FIG. 16 is a detail view of a portion of the end wall of FIG. 14.

In a preferred form of the invention, is is desired to have the front end-wall-forming flap overlie the rear end-wall-forming flap. It is desirable in such case to have the top edge portion of the rear end-wall-forming flap cut down, as shown in FIGS. 16 and 17 at 64, a distance at least equal to the thickness of the carton stock and for a length equal to the overlap. This allows for the overlapping of the top edge of the rear-end-wall-forming flap 32 by the inturned lip 40 of the front end-wall-forming flap 36. Lip 40 then abuts shoulder 64a of the uncut portion of flap 32 and prevents lateral relative displacement of the two flaps and the partial collapse of the front panel 20 which otherwise would result from such displacement.

FIG. 17 illustrates how the carton blanks of the invention are particularly adapted to high-speed production from a continuous sheet of carton stock and high-speed cutting and scoring machines. It will be observed that the laterally-extending flaps are progressively wider, so that when blanks are side by side in reverse order, the wider flaps of one blank are opposite the narrower flaps of the other blank, and so on. Thus, the front end-wall-forming flaps 36 of one sheet are the longest and abut the side-cover flaps 30, which are the shortest, and have cut-out portions 36c complementary to the curved portions 66 of the tuck-in tabs 30b. Then, in between, the bottom end-wall-forming flaps 34 of one sheet abut the rear end-wall-forming flaps 32 of the other sheet, the raised end portions 62 may abut each other or be spaced apart as shown and the other portions of the rear end-wall-forming flaps abut the bottom end-wall-forming flaps. The raised end portions 62 provide for a greater overlap of the front end-wall-forming flaps over the area of cut-out 36c and can be extended if desired, until they abut each other.

As illustrated in the lower left-hand corner, the tear strip 26 has a pull tab 26a formed by parallel cut-lines 27 adapted to be grasped to initiate the tear. This tab projects slightly beyond the end edge 24a of the glue panel 24 so that it can be easily gripped and the outermost edge is substantially coincident with the score line 28a, leaving room for the glue tab 28 to extend to a point opposite the tab 26a.

In FIG. 18, there is shown a modification in which one or othe other of both of the front and rear end-wall-forming flaps is extended the full width of the end wall, so that it occupies the full end of the carton tube, and thus overlies completely the contents of the tube. It is of advantage, however, that only one of these flaps be so extended, for example, the front end-wall-forming flap 136 since, if the overlying flap does not terminate short of the glue area, it will have to be joined (glued) thereto by a separate glue line applied along the edge of the underlying flap adjacent to the panel to which it is attached. Otherwise, the bottom end-wall-forming flap 134 would be glued to the free end of the overlapping front and rear end-wall-forming flap, so that an effective seal would not be obtained without the extra glue line.

This objection can be obviated by cutting away ile portions 136d of flaps 136 shown in dotted lines which would otherwise overlie the rear of flap 134 where the glue strip 60 would be applied. This would leave the flap 136 and the inturned lip intact all along the top edge and allow flap 136 to overlap flap 132. In such case, flaps 132 advantageously are cut down at their top edges enough to accommodate the inturned lip 140. This, coupled with the glue-flaps 28 overlying the end cover flaps 130, make for continuous, flat, surface-to-surface contact between the end-cover flaps 130 and the front end-wall-forming flaps 136, and continuous flat, surface-to-surface contact between the inturned lips 122 and 140 and the cover panel 114.

In this modification, the adjacent ends of lips 140 and 122 are cut on complementary 45 degree angles as shown at 142 with the apex of the angles aligned with fodl lines 136a.

In FIGS. 18, 19, and 26, the parts corresponding to the parts of FIG. 1, bear the same reference numerals, plus 100, 200, and 300, respectively.

In FIG. 19, there is illustrated a modification of FIGS. 1 and 18, in which the front end-wall-forming flaps 236 have cut-outs 236d which are complementary with portions of the tuck-in tabs 230b, the end cover flap 230, and the glue tab 228, so that this modification, too, can be easily formed in a continuous manner with high-speed cutting and scoring machines without too much loss of stock. If desired, flaps 236 can be cut away at 236b on the dotted lines to expose areas on flaps 232 for the application of a glue strip corresponding to glue strip 60 so that the flap 232 can underlie the flap 236. This gives an end in which the bottom end-forming flap 234 is sealed in a leakproof seal along each side edge of the end wall and in which the top edge of the front end wall forming flap 236 extends all, or substantially all, the way across the end wall, as does the inturned lip 240. In the latter case, the flap 132, advantageously, is cut down at 264 to accommodate lip 240 and to provide an abuttment 264a for the end of lip 240 to abut. The combined length of the uncut portion of flap 232 and flap 236 are equal to the width of the cover panel 214, so that partial collapse of the front panel is obviated.

Figure 20:
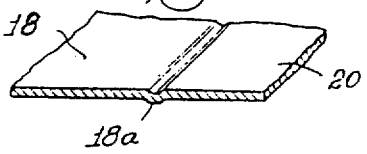
FIG. 20 is an isometric view of a partial section taken along line 20—20 of FIG. 1.
Figure 21:
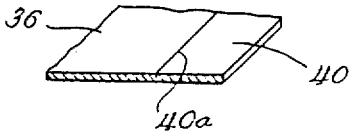
FIG. 21 is an isometric view of a partial section taken along line 21—21 of FIG. 1.
Figure 22:
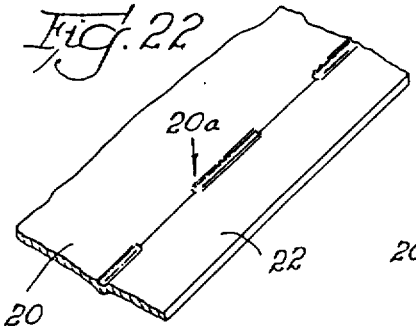
FIG. 22 is an isometric view of a partial section taken along line 22—22 of FIG. 1.
Figure 23:
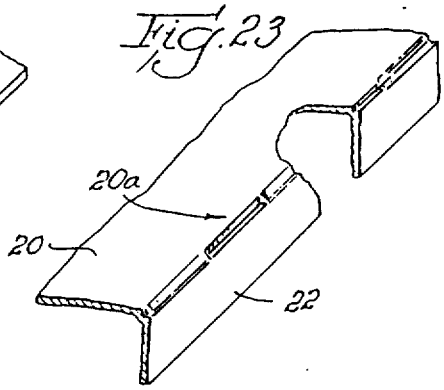
Figure 24:
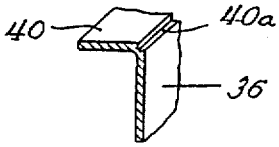
FIG. 24 is a partial section taken along line 24—24 of FIG. 16.
Figure 25:
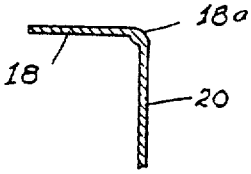
FIG. 25 is a partial section taken along line 25—25 of FIG. 5.

In FIGS. 20 through 25 are shown details of the type of scoring referred to herein. Thus, FIGS. 20 and 25 illustrate a press- or crease-score. FIGS. 21 and 24 illustrate a semi- or partial cut-score. And FIGS. 22 and 23 illustrate a skip-cut press-score in which cut-scores alternate with press scores.

In FIG. 26, there is shown a modification in which the corner between the lip 22 and lip 40 is half way between the one disclosed in FIG. 1 and the one disclosed in FIG. 18. As in the other two cases, the cuts are made to provide complementary angles so that in the assembled carton, continuity between lips 22 and 40 is maintained.

The modifications shown in FIGS. 1 and 17 has score lines 20a which are offset, relative to the top of the carton. In this construction, the ends 43 of lip 22 abut the end-wall-forming flaps 36 and the free edges of the front and side lips are coincident to effect a seal in the assembled carton to complete the seal.

Thus, the fold line 20a is slightly below the top of the carton, terminates short of the fold lines 36a, and its ends are connected thereto by shortcuts which slope upwardly to the juncture of the top edge of the front end-wall-forming flap 36 and fold line 36a. This allows the lip 22 to slope upwardly and inwardly from the fold line 20a to its contact with the underside of cover 14. The extent of the rise of lip 22, that is, the extent to which the fold line 20a is placed below the plane of the top of the main body, is not significant as long as the width of lip 22 is the hypotenuse of a triangle, the long leg of which, i.e., the horizontal projection of the lip 22 (hypotenuse), is substantially equal to the width of lip 40. Thus, in the assembled carton, the square cut ends 43 of lip 22 will substantially abut the front end-wall-forming flaps 36 and substantially abut the front end-wall-forming flaps 36 and the edges of the inturned lips 40 will abut the edge of inturned lip 22, so that the inner edges of the inturned lip 22 and inturned lips 40 will present a substantially continuous U-shaped edge in contact with the underside of the cover 14.

The same construction is used in the modification of FIG. 19.

In the modification shown in FIGS. 18, and 26, the fold lines 120c and 320a should be in alignment with the fold lines 140a and 340a, respectively, because it is desirable, in such modifications, that the cut ends of the inturned lips abut from the inner edges thereof to the fold lines. In the modifications shown in FIGS. 1 and 19, however, this is not necessary and it is possible, therefore, to take advantage of the desirability of having the fold lines 20a and 220c displaced, as described above and in my co-pending application supra.

If desired, the score line 40a can be similarly offset, as best seen in FIG. 17, or at 240a in FIG. 19. Ordinarily, however, this offset will not be greater than needed to keep the top of the infolded lip 40 in the plane of the underside of the cover panel 14.

As shown in FIG. 27, the tear-line 31a is formed by a skip-cut line comprised of a succession of cuts 33a and 33b. The cuts 33a coincide with the end 30c of the end cover flap 30 and the cuts 33b with the curved end 66b of that flap. The last cut 33a continues into the cut 33b. The latter terminates short of the free edge to leave an intact portion 31b. The first cut 33a cuts through the edge, thus making for a clean tear.

Figure 15:
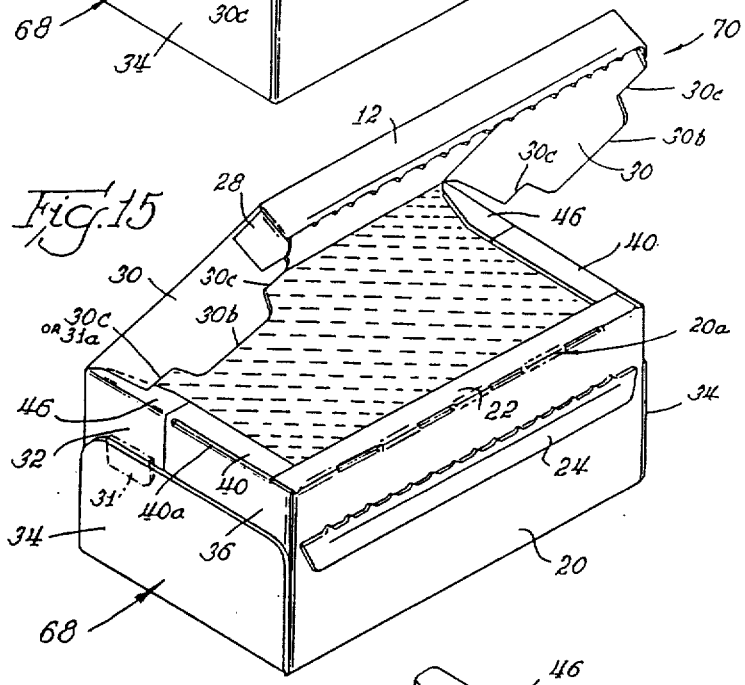
FIG. 15 is a like isometric view showing the cover raised.

From FIGS. 14 and 15, it can be seen that the carton blank of FIG. 1 or FIG. 17 can be folded into a carton which, in turn, can be filled to form a package in which the carton comprises a box-shaped main body 68, a hinged cover 60, which lies on the inturned lip 22, 40, and 46, which in turn lie in sealing contact with the under surface of the cover 70 along the front and end edges of the box-shaped main body 68. When the carton of this character, especially if the tear-out tabs 31 are provided as described, is filled with ice cream or like, frozen, normally liquid or semi-liquid solid material, a markedly improved leak-proof package is obtained. Even when the inturned flaps 46 on the rear end-wall-forming flaps 32 are omitted, the package is still substantially more leak-proof than the disclosed in my copending application Ser. No. 158,167, filed June 10, 1980, and my U.S. Pat. No. 4,239,115, issued on the parent thereof on Dec. 16, 1980.

Another advantage obtained from the use of the tear-out tab 31 is that it imparts greater rigidity to the rear corners of the container just as the glue-flaps 28 impart greater rigidity to the front corners of the container. Thus, when the tear-out tab 31 is used, the carton to be formed when one end is closed has improved rigidity and stability against the possible collapse of the rear wall of the carton tube.

It is to be understood that the invention is not to be limited to the exact details of construction, operation, or exact materials or embodiments shown and described, at various modifications and equivalents will be apparent to one skilled in the art, and the invention is therefore to be limited only by the full scope of the appended claims.

I claim:

1. In a filled package comprising a completely closed, rectangular carton made from the single unitary sheet of carton stock having cut portions and fold lines defining a front panel, a bottom panel, a rear panel, a cover panel, and a front cover flap which are articulated one to the other in the order named; said front cover flap having a skirt portion overlying said front panel but not adhered thereto and a sealing portion sealed to said front panel to form said panels into a carton having a rectangular transverse cross section; said front and rear panels having front and rear [inner] end-wall-forming flaps articulated thereto by fold lines and being folded in, [to form inner endwalls,] and said bottom panel having [outer] endwall-forming flaps articulated to the sides thereof by fold lines and being bent up [to a position to overlie the inner-wall-forming flaps] *and the end wall forming flaps are facially disposed and adhesively interconnected and form endwalls;* said cover panel having side cover flaps articulated to the side edges thereof by fold lines and folded down to overlie said endwall; said front cover flap skirt portion having glue-tabs articulated to the side edges thereof by fold lines, which tabs are glued to said side cover flaps to form, with said cover panel, a skirted cover hinged to said rear panel; the improvement in which said end walls have inturned end lips which are articulated thereto by lip-flap fold lines and which underlie and contact the underside of the cover panel at least along the free edges of each lip, but without being adhered thereto and, the front panel has a front lip which is articulated thereto by a panel-lip fold line and is in a position such that it underlies the underside of the cover panel and contacts the same at least along its free edge, but without being adhered thereto;

said lips having complementary shaped adjacent ends and being of such width that the inner edges of the end lips meet the inner edges of the front lip in right angle corners and provide a U-shaped line of contact between the edges of said lips and the under surface of said cover panel.

2. A package according to claim 1, in which the end lips extend substantially all the way across the closed ends.

3. A package according to claim 1, in which each of the end walls of said carton is formed from rear, front, and bottom end-wall-forming flaps; and front and rear end-wall-forming flaps forming rectangular inner end walls that determine the shape of the ends of said carton, said front end-wall-forming flaps having said end lips inturned from the top edges thereof and said front wall having said front lip inturned from the top edge of said front wall to underlie the cover panel.

4. A package according to claim 3, in which each of said rear end-wall-forming flaps has its top edge cut down a distance at least equal to the thickness of said carton stock and a length sufficient to accommodate the end lip which overlies it, whereby relative lateral movement of said inner end-wall-forming flaps before or during filling of the package is prevented.

5. A package according to claim 3, in which each of said rear end-wall-forming flaps has a complementary lip which forms an extension of the inturned lip on the complementary, front end-wall-forming flap, and in which the complementary and end lips on the complementary front and rear end-wall-forming flaps have complementary cut ends which abut in the closed ends.

6. A package according to claim 3, in which said front lip is square cut on lines displaced inwardly of the fold lines of the front end-wall-forming flaps a distance substantially equal to the thickness of the carton stock and the end lips are square cut outwardly of the same fold lines a distance substantially equal to the effective width of said front lip.

7. A package according to claim 6, in which the fold line of said front lip is displaced below said cover panel so that said front lip has a small rise from its fold line to its edge and in which the length and width thereof is such that the ends of said front lip substantially abut the front end-wall-forming flaps and the inner edge thereof is substantially coincident with the inner edges of said end lips.

8. A package according to claim 1, in which said front lip is articulated to said front wall on a skip-cut fold line aligned in the grain of the carton stock, and in which the parts of said skip-cut fold line between the cut portions thereof are press scored, and in which each said end lip is articulated to the top edge of said front end-wall-forming flap on a semi-cut-scored fold line aligned in the grain of the carton stock.

9. A package according to claim 3 in which said cover comprises end-cover flaps each having a tuck-in tab adapted to underlie the corresponding bottom end-wall-forming flap and a tear-out tab formed by a tear-line as a lateral extension of said tuck-in tab adjacent the hinged end of said cover, said tear-out tab being adhered to the portion of the bottom end-wall-forming flap that overlies it.

10. A package according to claim 9 in which said tear-out tab is connected to said end cover flap by a tear line which, is coincident with the top edge of the bottom end-wall-forming flap.

11. A package according to claim 10 in which said tear line is formed as a skip-cut of half-cut line having a cut at the end thereof at the end of the cover flap and an intact portion at the other end thereof, said intact portion forming a bridge between the tear-out tab and the tuck-in tab.

12. In a carton blank comprising a single sheet of carton stock having cut portions and fold lines defining a front panel, a bottom panel, a rear panel, a cover panel, and a front cover sealing flap; said panels being articulated one to the other in the order named, said front cover sealing flap being articulated to said cover panel by a fold line, and said front cover sealing flap being adapted to overlie said front panels and to be sealed thereto to form said panels into a tube having a rectangular transverse cross section in opened up position and into a collapsed parallelogram in the folded position; said front and rear panels having laterally-protecting front and rear [inner] end-wall-forming flaps articulated thereto by fold lines; said bottom panel having laterally-projecting [outer] end-wall-forming flaps articulated to the side edges thereof by fold lines and adapted to be bent up to a position [to overlie], in the erected carton, *facially disposed relative to* the [inner] end-wall-forming flaps *of said front and rear panels;* said cover panel having laterally-extending side cover flaps articulated to the side edges thereof by fold lines, which side cover flaps are adapted to overlie the [inner] end-wall-forming flaps in the erected carton; and the front cover flap having glue-flap extensions articulated to the side edges thereof by fold lines which extensions are adapted to be glued to said side cover flaps in the erected carton, to form, with said cover panel, a cover hinged to said rear panel and adapted to overlie the front panel and sides in the erected carton; the improvement in which the front end-wall-forming flaps have end lips articulated thereto by lip-flap fold lines in a position such that, in the erected carton, the inturned end lips underlie and contact the underside of the cover panel at least along the free edge of said lips;

the front panel has a front lip articulated thereto by a panel-lip fold line which is substantially coincident with said lip-flap lines and which is in a position such that, in the erected carton, the front lip underlies the underside of the cover panel and contacts the same at least along its free edge; said lips having complementary shaped adjacent ends and being of such width that, in the erected carton, the inner edges of end lips meet the inner edge of the front lip in right angle corners, and in which said front and rear end-wall-forming flaps together form, in the erected carton, rectangular [inner] endwalls that complete fill and determine the shape of the ends of the erected carton, and in which the cover panel side cover flaps each have a tuck-in tab adapted, in the erected carton, to [underlie] *rest against* the corresponding bottom end-wall-forming flap and a tear-out tab formed by a tear line as a lateral extension of said tuck-in tab adjacent the hinged end of said cover, said tear-out tab being adapted to be adhered to the portion of the [bottom] end-wall-forming flap that overlies it in the erected carton.

13. A carton blank of claim 12 in which said tear-out tab is connected to said side cover flap by a tear line which, in the erected carton, is coincident with the top edge of the bottom end-wall-forming flap.

14. A carton blank of claim 13 in which said tear-line is formed as a skip-cut or half-cut line having a cut at the end thereof at the end of the cover flap and an intact portion at the other end thereof, such intact portion forming a bridge between the tear-out tab and the tuck-in tab.

*15. A carton for ice cream or the like, comprising:*

*(a) a rectilinear carton body comprising cover, rear, bottom, front and front cover panels interconnected in the order named and at least a portion of said front cover panel is adhesively secured to said front panel and said cover panel is articulatable relative to said rear panel, each of said panels has first and second sides;*

*(b) an end wall forming flap extends from each of said rear, bottom and front panel sides, said end wall forming flaps are facially disposed and adhesively interconnected and form first and second end walls;*

*(c) a cover flap extends from said cover panel sides and each cover flap has a portion thereof releasably secured between the end wall forming flaps of an associated end wall;*

*(d) means operably connect each side of said front cover panel with the adjacent cover flap;*

*(e) end lips extend from each of said end walls, each end lip underlies and contacts the underside of said cover panel without being adhesively secured thereto;*

*(f) a front lip extends from said front panel and underlies and contacts the underside of said cover panel without being adhesively secured thereto; and,*

*(g) said lips have cooperatively shaped adjacent end portions so that an end portion of one lip abuts an end portion of an adjacent lip and thereby provides extended surface-to-surface contact with said cover panel.*

*16. The carton of claim 15, wherein:*

*(a) said lips lying on a common plane.*

*17. The carton of claim 15, wherein:*

*(a) said interconnecting means including a glue tab extending from each side of said front cover panel; and,*

*(b) said front cover panel portion includes a tear strip.*

*18. The carton of claim 15, wherein:*

*(a) said front lip extends substantially the length of said front panel; and,*

*(b) said end lips are carried by said front panel end wall forming flaps and extend substantially the length thereof.*

*19. The carton of claim 15, wherein:*

*(a) each cover flap portion is disposed between said bottom panel end wall forming flap and said rear panel end wall forming flap.*

*20. The carton of claim 18, wherein:*

*(a) said lips extend from the associated panels a common distance.*

* * * * *